(12) United States Patent
Li et al.

(10) Patent No.: US 9,582,090 B2
(45) Date of Patent: Feb. 28, 2017

(54) TOUCH DISPLAY DEVICE

(71) Applicant: Infovision Optoelectronics (Kunshan) Co., Ltd., JiangSu Province (CN)

(72) Inventors: Bin Li, JiangSu Province (CN); Feng-Ching Chiu, JiangSu Province (CN); Hung-Ming Lee, JiangSu Province (CN)

(73) Assignee: INFOVISION OPTOELECTRONICS (KUNSHAN) CO., LTD., Kunshan (CN)

( * ) Notice: Subject to any disclaimer, the term of this patent is extended or adjusted under 35 U.S.C. 154(b) by 115 days.

(21) Appl. No.: 14/229,998

(22) Filed: Mar. 31, 2014

(65) Prior Publication Data

US 2015/0199038 A1 Jul. 16, 2015

(30) Foreign Application Priority Data

Jan. 15, 2014 (CN) .......................... 2014 1 0016613

(51) Int. Cl.
*G06F 3/041* (2006.01)
*G06F 1/16* (2006.01)

(52) U.S. Cl.
CPC ............ *G06F 3/041* (2013.01); *G06F 1/1626* (2013.01); *G06F 1/1637* (2013.01); *G06F 1/1643* (2013.01); *G06F 2203/04103* (2013.01)

(58) Field of Classification Search
CPC .......... G06F 3/044; G06F 3/045; G06F 3/041; G06F 3/0412; G06F 2203/04103; G06F 2203/04112; G02F 1/13338; G02F 1/133305; G02F 2202/28; G02F 2201/50; G02F 2001/133562; H03K 17/962; H05K 3/361; H05K 2201/0108; B32B 7/12; H01B 1/22
See application file for complete search history.

(56) References Cited

U.S. PATENT DOCUMENTS

2007/0229468 A1* 10/2007 Peng ...................... G06F 3/044
345/173
2010/0007616 A1* 1/2010 Jang ..................... G06F 3/0412
345/173

(Continued)

FOREIGN PATENT DOCUMENTS

CN 101236311 A 8/2008
CN 101387772 A 3/2009

*Primary Examiner* — Nalini Mummalaneni
(74) *Attorney, Agent, or Firm* — Ding Yu Tan

(57) ABSTRACT

A touch display device includes a first substrate, a second substrate opposite to the first substrate, a display medium sandwiched between the two substrates, and a touch-sensitive layer including sensitive electrode lines. The first substrate includes a first surface facing the display medium layer and a second surface far away from the display medium layer and opposite to the first surface. The touch-sensitive layer is disposed on the second surface of the first substrate, and first pins are disposed on a side area of the first substrate corresponding to a side of the touch display device to connect the sensitive electrode lines. Second pins are disposed on a side area of the second substrate corresponding to the same side of the touch display device, and connected to the first pins via a first printed circuit board (PCB). The first PCB is a flexible PCB.

5 Claims, 8 Drawing Sheets

(56) References Cited

U.S. PATENT DOCUMENTS

2010/0110041 A1* 5/2010 Jang .................. G06F 3/0412
345/174
2011/0242050 A1* 10/2011 Byun .................. G06F 3/044
345/174

* cited by examiner

US 9,582,090 B2

TOUCH DISPLAY DEVICE

CROSS-REFERENCE TO RELATED APPLICATION

This application claims priority from Chinese Patent Application No. 201410016613.4 filed on Jan. 15, 2014. The content of the above-mentioned patent application is hereby incorporated by reference herein in its entirety and made a part of this specification.

FIELD OF THE INVENTION

The present invention relates to the field of display technology, and more particularly to a touch display device.

BACKGROUND OF THE INVENTION

Along with the increasingly development of science and technology, digital devices such as mobile phone, personal digital assistant (PDA), notebook and such like, are developed to be more convenient, versatile and artistic. Display screens are indispensable man-machine communication interfaces in these digital devices. At present, most of the display screens use liquid crystal display (LCD) technology.

On the other hand, along with the rapid development and application of information technology, wireless communication and information appliance, in order to be easier, lighter and more user-friendly, many information products use touch panel as an input device instead of conventional input device such as a keyboard or a mouse, and now touch-sensitive LCD device has become a mainstream product.

The touch-sensitive LCD device mainly includes two types, one of the two types is named On Cell whose touch panel is directly attached on the LCD panel, and the other of the two types is named In Cell whose touch sensors are integrated into the LCD panel. However, thickness of a conventional On Cell touch-sensitive LCD device is too large, and due to complex structure and complex manufacturing process, production yield of the In Cell touch-sensitive LCD device is low. Therefore, one layer On Cell touch-sensitive LCD device is developed, which forms a single touch-sensitive layer having transparent electrode pattern between an upper substrate and an upper polarizer of the LCD panel. Comparing with the conventional On Cell touch-sensitive LCD device, one layer On Cell touch-sensitive LCD device at least omits one transparent substrate and one adhesive layer, therefore, the thickness of one layer On Cell touch-sensitive LCD device is smaller. Comparing with In Cell touch-sensitive LCD device, the manufacturing process of one layer On Cell touch-sensitive LCD device is simple, and the production yield of one layer On Cell touch-sensitive LCD device is high. Thus, one layer On Cell touch-sensitive LCD device is widely used.

Referring to FIG. 1, FIG. 1 is a schematic plan view of a typical one layer On Cell touch-sensitive LCD device. As show in FIG. 1, the touch display device 10 includes an upper substrate 11 and a lower substrate 12. A touch-sensitive layer (not shown) formed of transparent conductive material is disposed on the upper substrate 11. Sensitive electrode lines (not shown) of the touch-sensitive layer are connected to an external touch printed circuit board (PCB) (not shown) via a flexible PCB 13. Display electrode lines are disposed on the lower substrate 12, and are connected to a PCB 16 via a flexible PCB 15. A touch signal processing chip is disposed on the external touch PCB, and the flexible PCB 13 transfers touch-sensitive signals from the sensitive electrode lines to the external touch PCB for the touch signal processing chip to process. The PCB 16 is disposed with power supply circuit, timing controller, image signal generator and so on, and provides power supply signals, image signals, driving signals, control signals, timing signals and so on which are used to display images to display panel via the flexible PCB 15.

However, due to the sensitive electrode lines of the touch-sensitive layer needing the flexible PCB 13 to connect the external touch PCB, the cost used to obtain the flexible PCB 13 and the external touch PCB is increased. Further, when assembling modules of the touch display device 10, the flexible PCB 13 and the external touch PCB need to be fixed behind the display panel, which occupies more space and increases the thickness of the touch display device 10. Furthermore, the flexible PCB 13 needs to bypass the lower substrate 12 to connect the external touch PCB, therefore, length of the flexible PCB 13 needs to be large enough; and due to stress generated when the flexible PCB 13 bends being large, the flexible PCB 13 is liable to fall off, which easily causes abnormal touch result.

In addition, in another case, the external touch PCB is omitted, and the touch signal processing chip is directly disposed on the flexible PCB 13. However, although the cost of the external touch PCB is accordingly saved, the disposing of the touch signal processing chip on the flexible PCB 13 needs redesigning mould or mold for the flexible PCB 13, and the manufacturing cost of the flexible PCB 13 is increased.

What is needed, therefore, is an improved touch display device that can overcome the above-described problems.

SUMMARY OF THE INVENTION

Accordingly, a touch display device in accordance with an embodiment is adapted, the touch display device has a first side, a second side, a third side and a fourth side connected end to end, and includes a first substrate, a second substrate opposite to the first substrate, a display medium sandwiched between the two substrates, and a touch-sensitive layer including sensitive electrode lines. The first substrate includes a first surface facing the display medium layer and a second surface far away from the display medium layer and opposite to the first surface. The touch-sensitive layer is disposed on the second surface of the first substrate, and first pins are disposed on a side area of the first substrate corresponding to the first side of the touch display device to connect the sensitive electrode lines. Second pins are disposed on a side area of the second substrate corresponding to the same side of the touch display device, and connected to the first pins via a first printed circuit board (PCB). The first PCB is a flexible PCB.

A touch display device in accordance with another embodiment is adapted, and includes a first substrate, a second substrate opposite to the first substrate, a display medium sandwiched between the two substrates, and a touch-sensitive layer including sensitive electrode lines. The first substrate includes a first surface facing the display medium layer and a second surface far away from the display medium layer and opposite to the first surface. The touch-sensitive layer is disposed on the second surface of the first substrate, and first pins are disposed on a side area of the first substrate corresponding to a side of the touch display device to connect the sensitive electrode lines. Second pins are disposed on a side area of the second substrate corresponding to the same side of the touch display device, and connected to the first pins via a first printed circuit board (PCB). The first PCB is a flexible PCB.

Other novel features and advantages will become more apparent from the following detailed description when taken in conjunction with the accompanying drawings.

DETAILED DESCRIPTION OF THE EMBODIMENTS

In order to make the purpose, the features and the advantages of the embodiments of the present invention become more readily apparent. The present invention will now be described more specifically with reference to the following embodiments.

It is to be noted that the accompanying drawings of the present invention merely show the essential structure features related to the spirit of the invention, and omit other obvious structure features.

Figure 2:
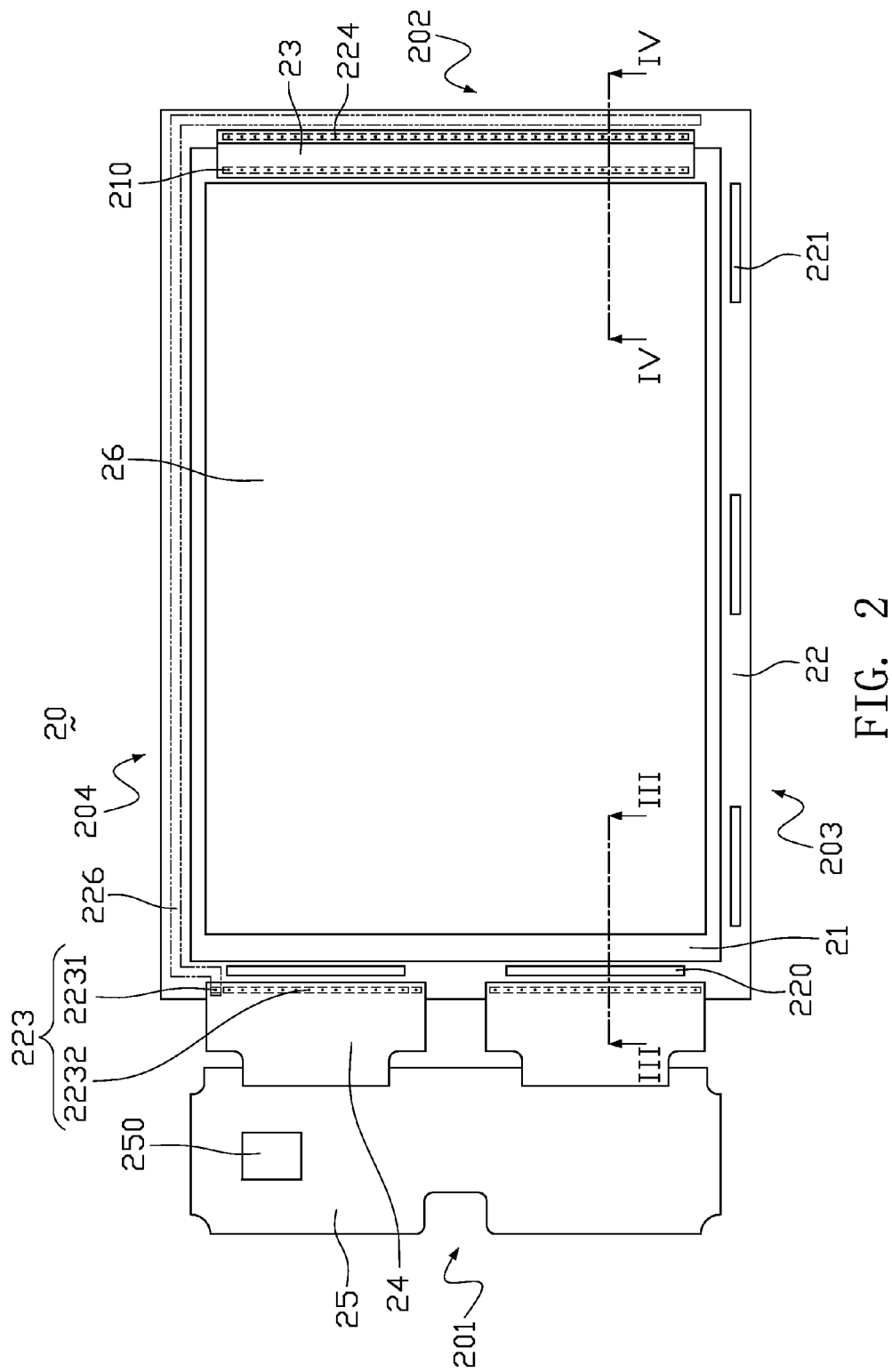
FIG. 2 is a schematic plan view of a touch display device according to a first embodiment of the present invention.

Referring to FIG. 2, FIG. 2 is a schematic plan view of a touch display device 20 according to a first embodiment of the present invention. As shown in FIG. 2, the touch display device 20 includes a first substrate 21, a second substrate 22 disposed opposite to the first substrate 21, a display medium layer (not shown) sandwiched between the first substrate 21 and the second substrate 22, and a touch-sensitive layer (not shown) formed of transparent conductive material disposed on the first substrate 21. The first substrate 21 includes a first surface facing the display medium layer, and a second surface far away from the display medium layer and opposite to the first surface of the first substrate 21. The touch-sensitive layer is disposed on the second surface of the first substrate 21.

The first substrate 21 is a color filter substrate on which a color filter is disposed, and the second substrate 22 is a thin film transistor array substrate on which a thin film transistor array is disposed. In this embodiment, the display medium layer is a liquid crystal layer. In another embodiment, the display medium layer can be an organic light-emitting layer. The present invention is not limited to the display medium layer.

The touch display device 20 has four sides that are connected end to end, and the four sides thereof are respectively defined as a first side 201, a second side 202 opposite to the first side 201, a third side 203 connected between the first side 201 and the second side 202, and a fourth side 204 opposite to the third side 203.

A plurality of first pins 210 are disposed on a side area of the first substrate 21 corresponding to one of the four sides, e.g., the second side 202 of the touch display device 20. The touch-sensitive layer includes a plurality of sensitive electrode lines, the sensitive electrode lines extends to respectively connect the corresponding first pins 210.

The second substrate 22 includes one or more gate driving chips 220 and one or more data driving chips 221. The gate driving chips 220 are disposed on a side area of the second substrate 22 corresponding to the first side 201 of the touch display device 20, and the data driving chips 221 are disposed on a side area of the second substrate 22 corresponding to the third side 203 of the touch display device 20. A plurality of second pins 224 are disposed on an edge or side area of the second substrate 22 corresponding to the same side, e.g., the second side 202 of the touch display device 20, as the first pins 210 are located in, and a plurality of third pins 223 are disposed on an edge area of the second substrate 22 corresponding to the first side 201 of the touch display device 20. The second pins 224 are defined as touch signal pins and used to transfer touch signals. The third pins 223 are defined as external-connecting pins, and include a plurality of fourth pins 2231 and a plurality of fifth pins 2232. The fourth pins 2231 are used to transfer the touch signals, and thus defined as touch signal pins; and the fifth pins 2232 are used to transfer display signals for the touch display device 20 to display images, and thus are defined as display signal pins.

The touch display device 20 further includes a first PCB 23 to connect the first pins 210 of the first substrate 21 and the second pins 224 of the second substrate 22. That is, the sensitive electrode lines of the first substrate 21 are coupled to the second substrate 22 via the first PCB 23. The first PCB 23 is a flexible PCB.

The second substrate 22 further includes a touch signal line area 226, and the touch signal line area 226 is mainly at a side area of the second substrate 22 corresponding to the fourth side 204 of the touch display device 20 and at the side area of the second substrate 22 corresponding to the second side 202 of the touch display device 20. A plurality of signal lines located in the touch signal line area 226 used to transfer the touch signals are respectively connected to the second pins 224 and respectively to the fourth pins 2231, and are defined as touch signal lines. Due to the fourth pins 2231 and the second pins 224 being respectively disposed at two opposite side areas of the second substrate 22 corresponding to the first side 201 and the second side 202 of the touch display device 20, the touch signal lines in the side area of the second substrate 22 corresponding to the second side 202 of the touch display device 20 are integrated. That is, some of the touch signal lines which transfer the same driving signals are connected together to form one integrated touch signal line, and the touch signal lines includes a plurality of integrated touch signal lines. The integrated touch signal lines extend along in the touch signal line area 226 at the side area of the second substrate 22 corresponding to the fourth side 204 of the touch display device 20 to respectively connect the corresponding fourth pins 2231.

In this embodiment, the touch display device 20 further includes a second PCB 24 to connect the third pins 223 and a third PCB 25. The second PCB 24 is a flexible PCB. The fourth pins 2231 of the third pins 223 are connected to the touch signal lines in the touch signal line area 226, and the fifth pins 2232 of the third pins 223 are connected to the display signal lines in the second substrate 22. The third PCB 25 includes a touch signal processing chip 250, and the touch signal processing chip 250 is used to receive and process the touch signals transferred by the second PCB 24. The third PCB 25 further includes a power supply circuit, a timing controller, an image signal generator and so on, and provides the display signals such as power supply signals, image signals, driving signals, control signals, timing signals and so on to the second substrate 22 via the second PCB 24. The touch display device 20 normally operates via the touch signals and the display signals.

In another embodiment, the touch display device 20 can omit the third PCB 25, and the touch signal processing chip 250, the power supply circuit, the timing controller, the image signal generator and other circuits can then be directly disposed on the second PCB 24. Therefore, the cost of the touch display device 20 can be decreased. Further, because of without soldering gold fingers on the touch display device 20 which are used to connect the third PCB 25, the problem of defective soldering reduces.

Figure 3:
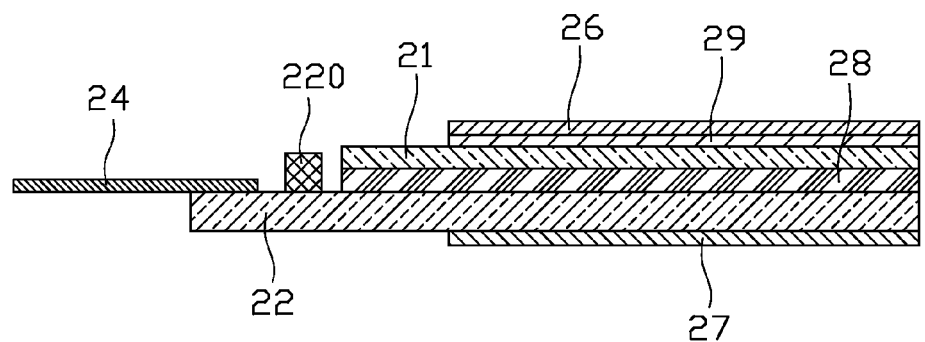
FIG. 3 is a cross-sectional view of a portion of the touch display device taken along the line III-III in FIG. 2.
Figure 4:
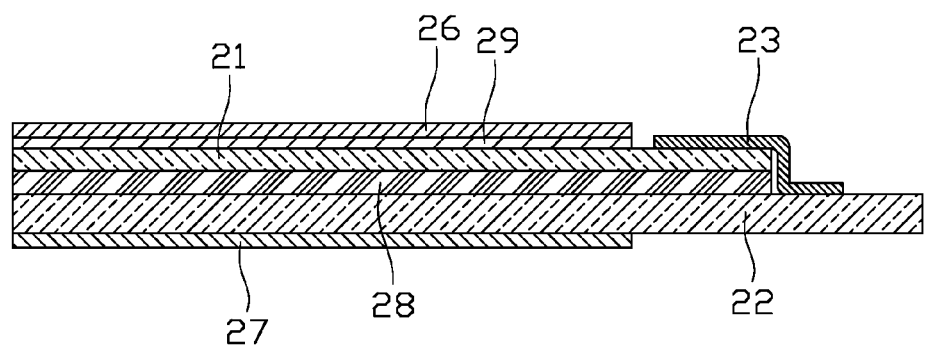
FIG. 4 is a cross-sectional view of a portion of the touch display device taken along the line IV-IV in FIG. 2.

Referring to FIG. 3 and FIG. 4, FIG. 3 is a cross-sectional view of the touch display device 20 taken along the line III-III in FIG. 2, and FIG. 4 is a cross-sectional view of the touch display device 20 taken along the line IV-IV in FIG. 2. As shown in FIG. 3 and FIG. 4, the touch display device 20 includes the first substrate 21, the second substrate 22 disposed opposite to the first substrate 21, the display medium layer 28 sandwiched between the first substrate 21 and the second substrate 22, the touch-sensitive layer 29, a first polarizer 26, and a second polarizer 27. The first substrate 21 includes a first surface facing the display medium layer 28, and a second surface far away from the display medium layer 28 and opposite to the first surface of the first substrate 21. The second substrate 22 includes a third surface facing the display medium layer 28, and a fourth surface far away from the display medium layer 28 and opposite to the third surface of the second substrate 22. The first polarizer 26 is disposed on the second surface of the first substrate 21, the touch-sensitive layer 29 is disposed between the first polarizer 26 and the first substrate 21, and the second polarizer 27 is disposed on the fourth surface of the second substrate 22. The gate driving chips 220 are disposed on the third surface of the second substrate 22, and one terminal of the second PCB 24 is soldered on an edge area of the second substrate 22.

As shown in FIG. 2 and FIG. 4, due to the sensitive electrode lines of the first substrate 21 coupled to the second substrate 22 via the first PCB 23 and connected to the third PCB 25 with the display signal lines of the second substrate 22 via the second PCB 24 to achieve touch display, both of the first pins 210 of the first substrate 21 connected to the first PCB 23 and the second pins 224 of the second substrate 22 connected to the first PCB 23 are disposed on the second side 202 of the touch display device 20. Therefore, when assembling the touch display device 20, the first PCB 23 does not need to bypass the second substrate 22. Thus, the length of the first PCB 23 is less than that of the conventional touch display device 10, the first PCB 23 is not liable to be broken off, and a production yield of the touch display device 20 is improved. Further, due to the touch signal processing chip 250 being disposed on the third PCB 25, the touch display device 20 does not need another touch PCB to carry or dispose the touch signal processing chip 250. Therefore, the cost of the touch display device 20 is decreased, and thickness of the touch display device 20 is also decreased.

Figure 1:
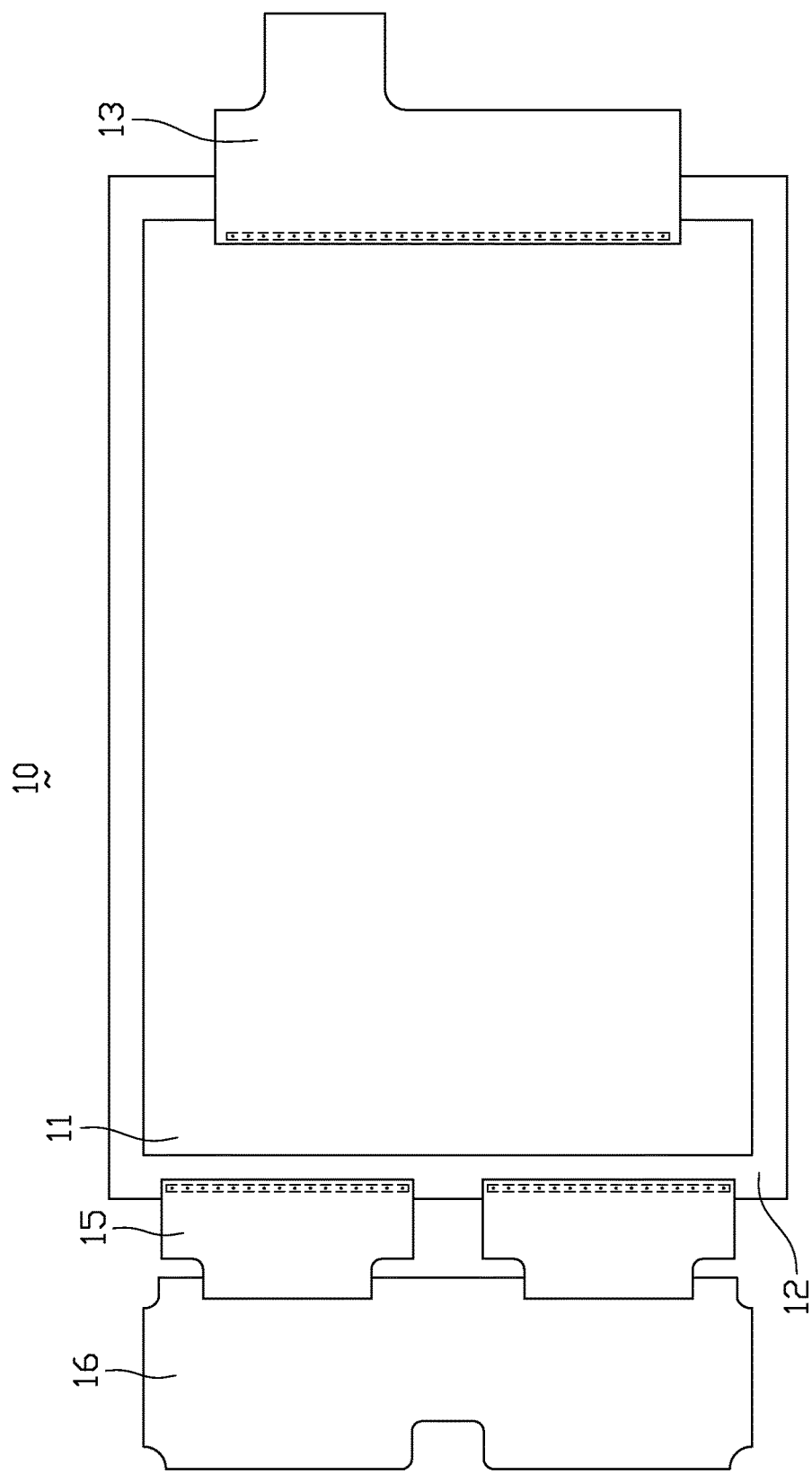
FIG. 1 is a schematic plan view of a typical one layer On Cell touch-sensitive LCD device.

In addition, whether the touch signal processing chip of the conventional touch display device 10 in FIG. 1 is disposed on the flexible PCB 13 or the external touch PCB, the flexible PCB 13 and the PCB 16, or the external touch PCB and the PCB 16, all need to have redesigned moulds, respectively, and redesigning moulds is expensive. However, in this embodiment, the touch signal processing chip 250 with the power supply circuit, the timing controller, the image signal generator and other circuits are disposed on the third PCB 25, thus only designing mould for the third PCB 25 is needed. Therefore, the cost of the touch display device is decreased.

Figure 5:
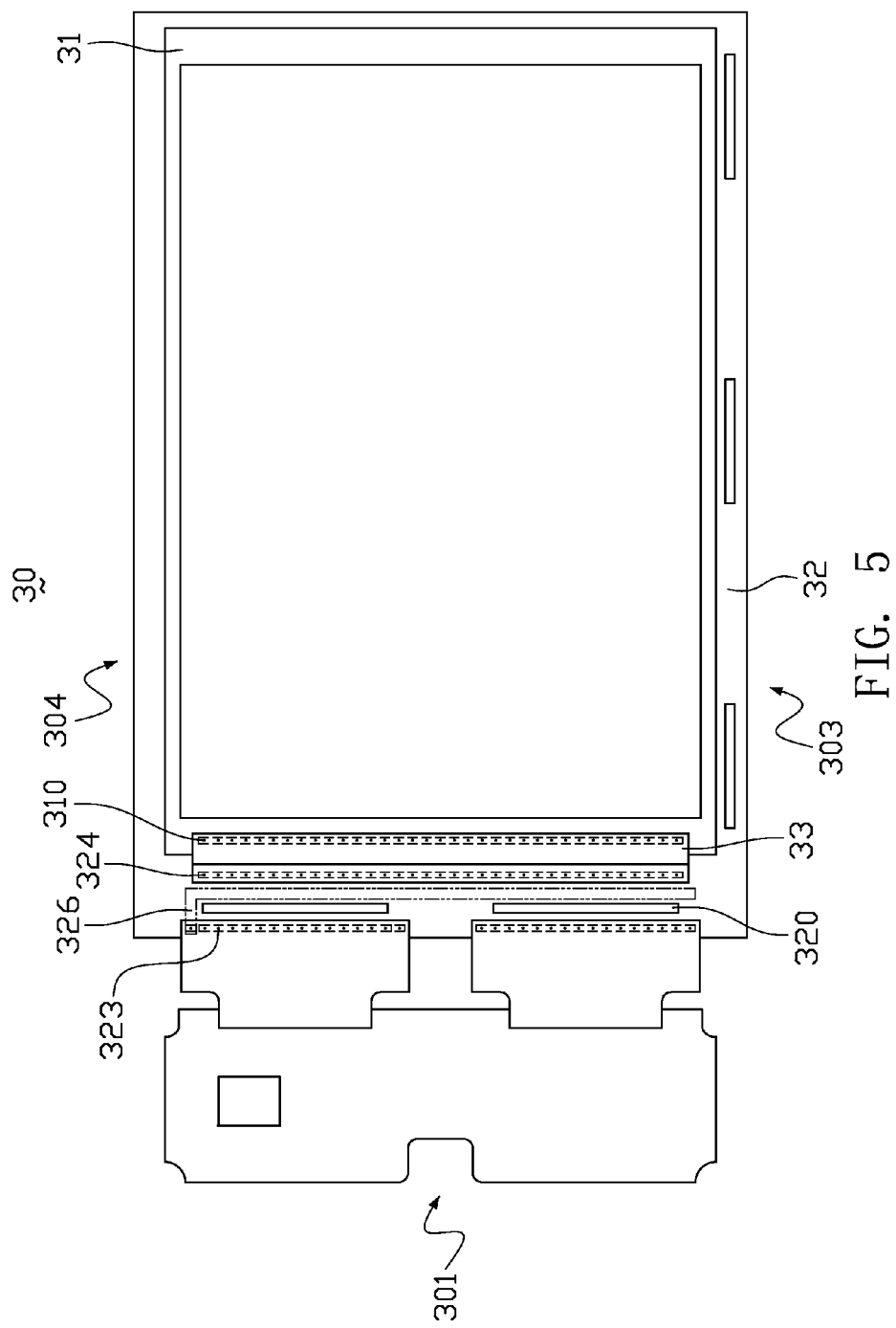
FIG. 5 is a schematic plan view of a touch display device according to a second embodiment of the present invention.

Referring to FIG. 5, FIG. 5 is a schematic plan view of a touch display device 30 according to a second embodiment of the present invention. As shown in FIG. 5, the touch display device 30 is similar to the touch display device 20 of the first embodiment of the present invention, and the main differences between the touch display device 30 and the touch display device 20 are described below.

In this embodiment, a plurality of first pins 310 are disposed on a side area of a first substrate 31 corresponding to a first side 301 of the touch display device 30, and a plurality of second pins 324 and a plurality of third pins 323 and one or more gate driving chips 320 are disposed on a side area of a second substrate 32 also corresponding to the first side 301 of the touch display device 30. The second pins 324 and the third pins 323 are disposed at two opposite sides of the one or more gate driving chips 320, the second pins 324 are disposed between the gate driving chips 320 and the first pins 310, and the third pins 323 are disposed between an edge of the second substrate 32 and the gate driving chips 320.

A first PCB 33 is used to connect the first pins 310 of the first substrate 31 and the second pins 324 of the second substrate 32, and sensitive electrode lines of the first substrate 31 are coupled to the second substrate 32 via the first PCB 33.

In this embodiment, the touch display device 30 not only has the same advantages as the touch display device 20, such as lower cost, smaller thickness, the first PCB 33 being not easily broken off, and so on, but also additional advantage due to having the second pins 324 and the third pins 323 both being disposed on the same side area of the second substrate 32 corresponding to the first side 301 of the touch display device 30, touch signal lines in a touch signal line area 326 of the second substrate 32 do not need to travel through a side area of the second substrate 32 corresponding to a fourth side 304 of the touch display device 30. Therefore, width between a third side 303 and the fourth side 304 of the touch display device 30 can be reduced, and the touch display device 30 is easier to achieve of narrow border design at the third side 303 and the fourth side 304 than the touch display device 20.

Figure 6:
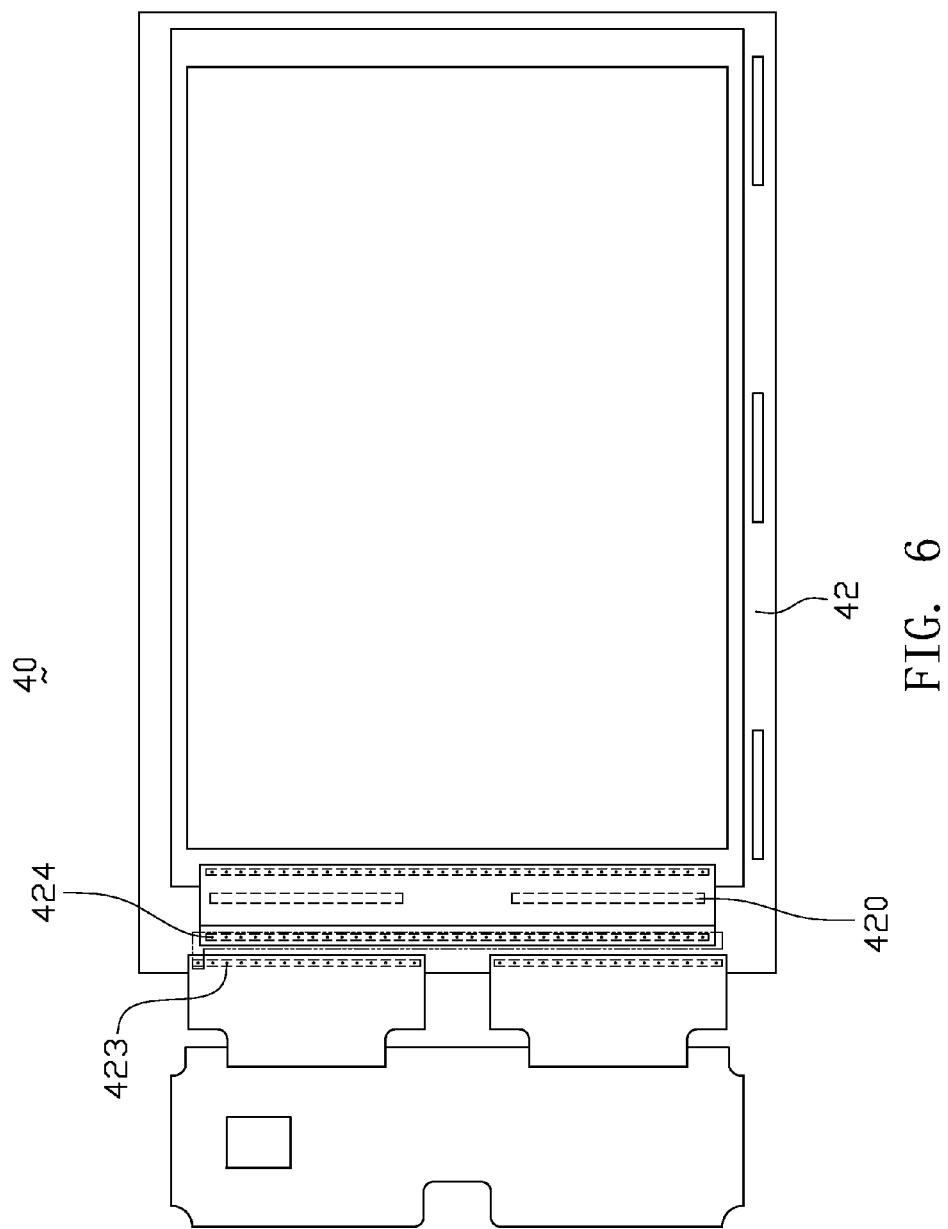
FIG. 6 is a schematic plan view of a touch display device according to a third embodiment of the present invention.

Referring to FIG. 6, FIG. 6 is a schematic plan view of a touch display device 40 according to a third embodiment of the present invention. As shown in FIG. 6, the touch display device 40 is similar to the touch display device 30 of the second embodiment of the present invention, and the main differences between the touch display device 40 and the touch display device 30 are described below.

In this embodiment, a plurality of third pins 423 are disposed between an edge of a second substrate 42 and a plurality of gate driving chips 420, and a plurality of second pins 424 are disposed between the third pins 423 and the gate driving chips 420.

Figure 7:
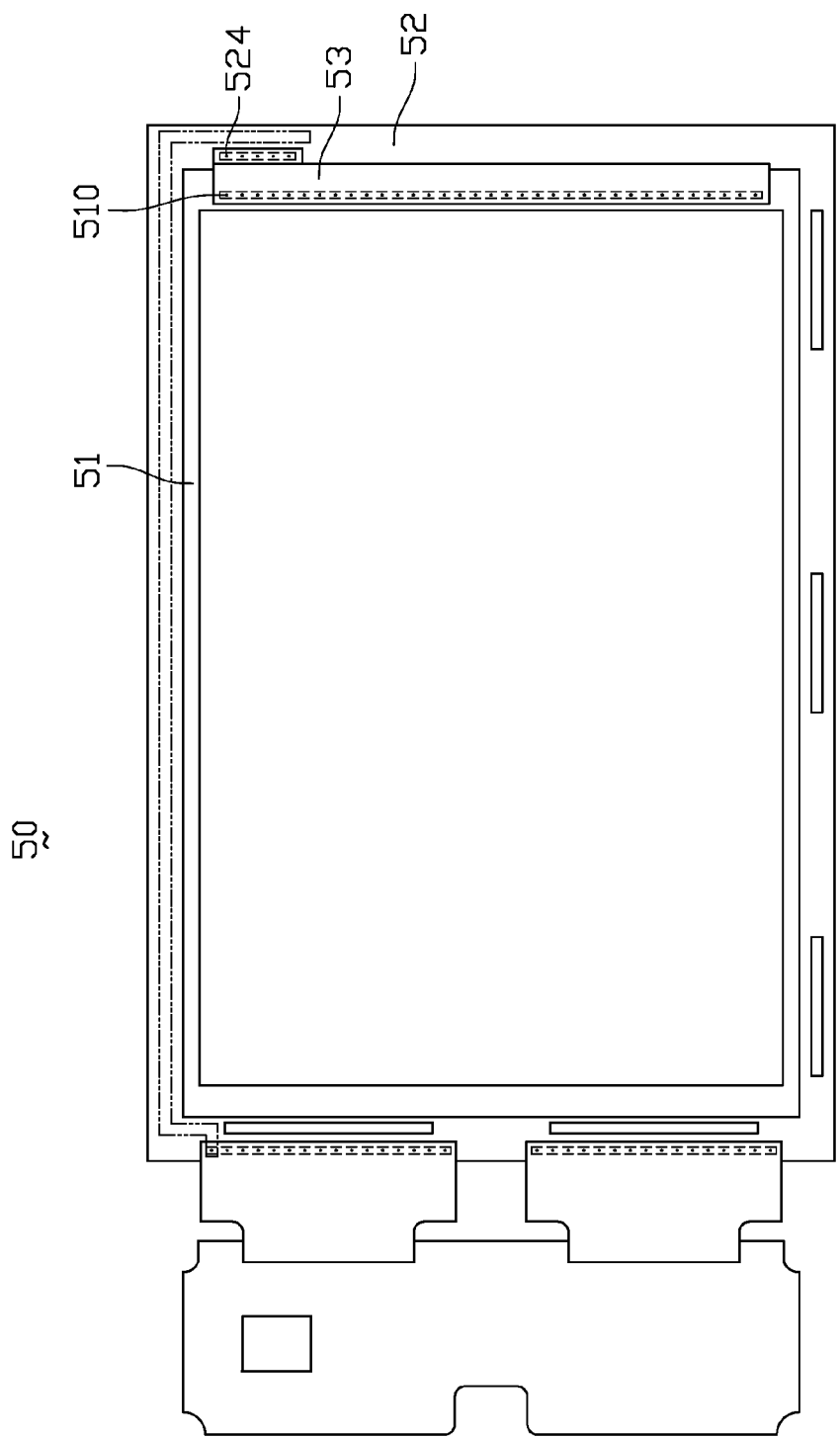
FIG. 7 is a schematic plan view of a touch display device according to a fourth embodiment of the present invention.

Referring to FIG. 7, FIG. 7 is a schematic plan view of a touch display device 50 according to a fourth embodiment of the present invention. As shown in FIG. 7, the touch display device 50 is similar to the touch display device 20 of the first embodiment of the present invention, and the main differences between the touch display device 50 and the touch display device 20 are described below.

In this embodiment, touch signal lines in a first PCB 53 that are connected to a plurality of first pins 510 of a first substrate 51 are firstly integrated and then connected to a plurality of second pins 524 of a second substrate 52. The touch display device 50 not only has the same advantages as the touch display device 20, such as lower cost, smaller thickness, the first PCB 53 being not easily broken off, and so on, but also advantages such as, the size of the first PCB 53 being less than that of the first PCB 23 of the touch display device 20, and quantity of the second pins 524 is also less than that of the second pins 224 of the touch display device 20. Therefore, the cost of the touch display device 50 is further decreased.

Figure 8:
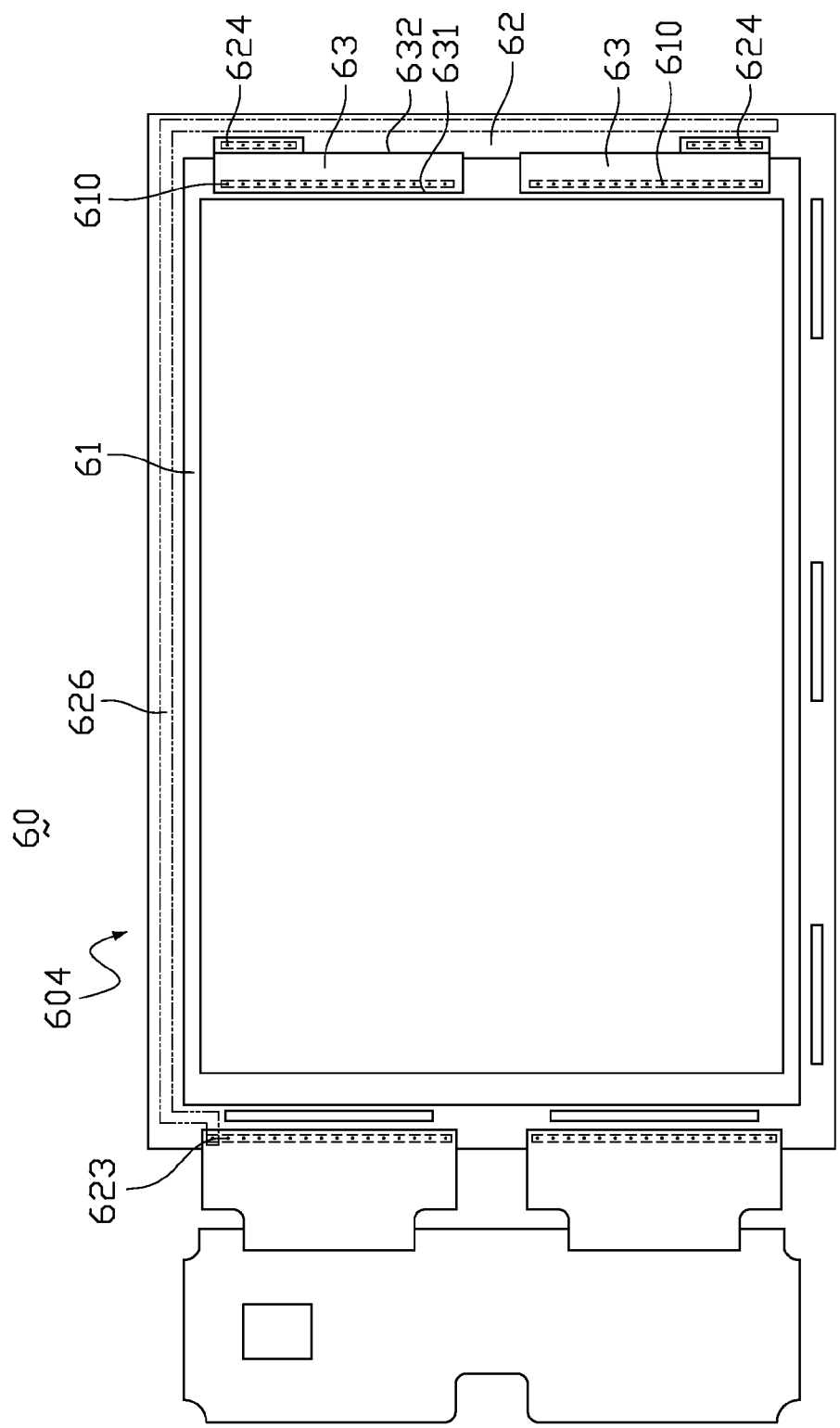
FIG. 8 is a schematic plan view of a touch display device according to a fifth embodiment of the present invention.

Referring to FIG. 8, FIG. 8 is a schematic plan view of a touch display device 60 according to a fifth embodiment of the present invention. As shown in FIG. 8, the touch display device 60 is similar to the touch display device 50 of the fourth embodiment of the present invention, and the main differences between the touch display device 60 and the touch display device 50 are described below.

In this embodiment, a plurality of first pins 610 of a first substrate 61 are divided into two groups, and the groups of the first pins 610 are respectively connected to two first PCBs 63. Touch signal lines of each of the two first PCBs 63 are firstly integrated and converged and then connected to corresponding second pins 624 of a second substrate 62. The second pins 624 of the second substrate 62 are also divided into two groups, and the groups of the second pins 624 are respectively connected to the two first PCBs 63. Touch signal lines in a touch signal line area 626 of the second substrate 62 extends from the second pins 624, along a side area of the second substrate 62 corresponding to a fourth side 604 of the touch display device 60, to corresponding third pins 623. Each of the two first PCBs 63 has a first edge 631 and a second edge 632 opposite to the first edge 631 thereof. The touch signal lines from the first pins 610 are firstly connected to the two first PCBs 63, then, they are bent to connect to the second pins 624, and the bent touch signal lines are arranged in parallel in the first PCB 63 along the direction from the first edge 631 to the second edge 632 of the first PCB 63, which needs the first PCB 63 having an enough width between the first edge 631 to the second edge 632. To reduce electromagnetic interference between two adjacent lines, a proper gap needs to exist between every two adjacent lines, which needs the first PCB 63 to have larger width. Due to the two first PCBs 63 dividing equally the lines connected to all of the first pins 610, after bent, half of the lines connected to one group of the first pins 610 are parallel and arranged in one of the two first PCBs 63, and the other half of the lines connected to the other group of the first pins 610 are parallel and arranged in the other one of the two first PCBs 63. Therefore, the width of the first PCB 63 between the first edge 631 and the second edge 632 can be reduced to half of the width of the first PCB 53 of the touch display device 50. Thus, the material cost of the two first PCBs 63 is further decreased, and a width of a side (in non-display area) of the first substrate 61 at which the first pins 610 are disposed is also reduced.

Figure 9:
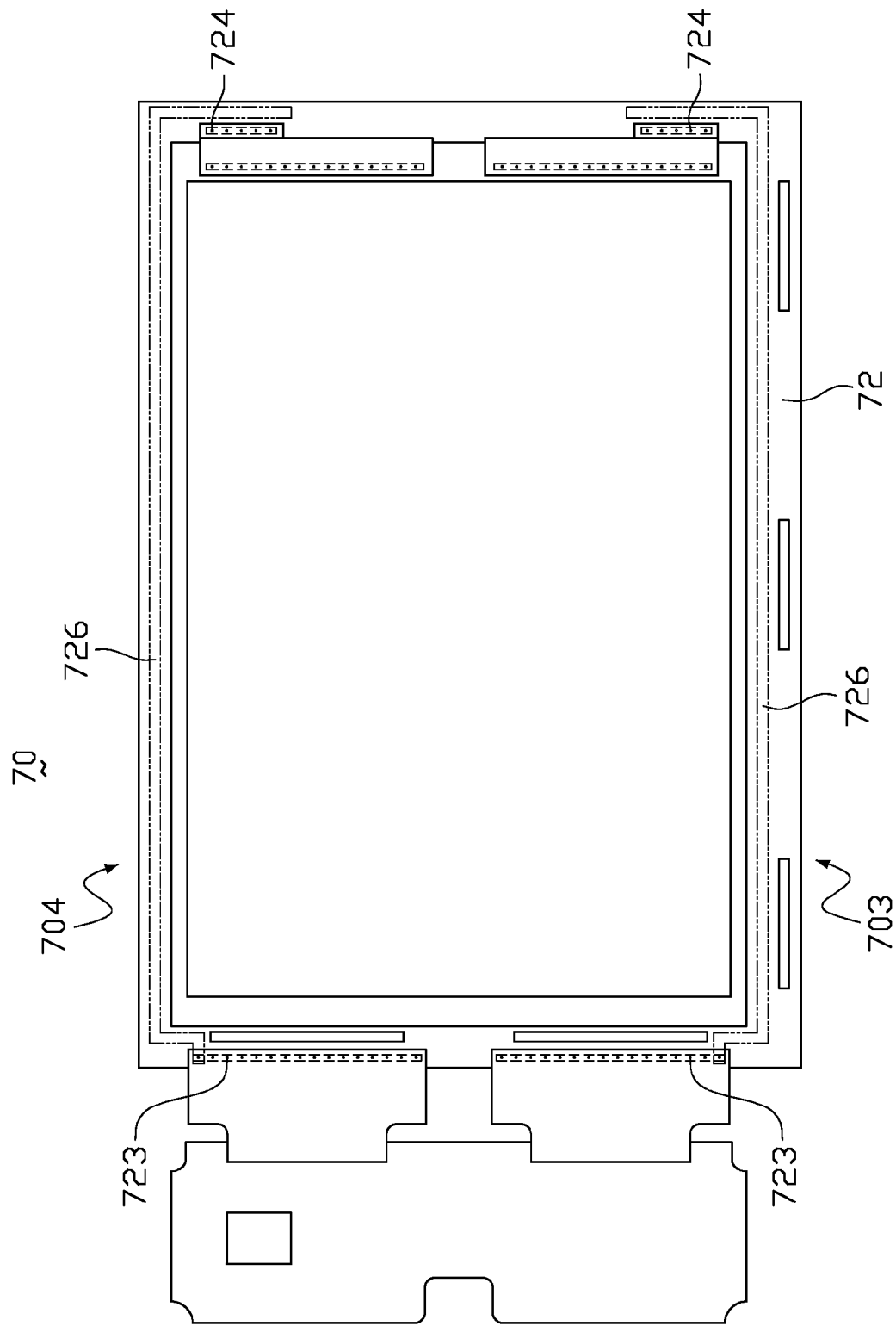
FIG. 9 is a schematic plan view of a touch display device according to a sixth embodiment of the present invention.

Referring to FIG. 9, FIG. 9 is a schematic plan view of a touch display device 70 according to a sixth embodiment of the present invention. As shown in FIG. 9, the touch display device 70 is similar to the touch display device 60 of the fifth embodiment of the present invention, and the main differences between the touch display device 70 and the touch display device 60 are described below.

In this embodiment, a touch signal line area 726 of a second substrate 72 is divided into two parts. Touch signal lines of one part of the touch signal line area 726 are connected to one group of the second pins 724, and extend along a side area of the second substrate 72 corresponding to a fourth side 704 of the touch display device 70 to corresponding third pins 723, and touch signal lines of the other part of the touch signal line area 726 are connected to the other group of the second pins 724, and extend along the other side area of the second substrate 72 corresponding to a third side 703 of the touch display device 70 to another corresponding third pins 723.

The touch display device 70 not only has the same advantages as the touch display device 20, such as lower cost, smaller thickness, the first PCB being not easily broken off, and so on, but also due to dividing the touch signal lines into two parts respectively disposed in two side areas of the second substrate 72 respectively corresponding to the third side 703 and the fourth side 704 of the touch display device 70, the asymetrical configuration of only increasing width of one side area of the second substrate 72 is being prevented from in this embodiment, and two non-display areas of the touch display device 70 are substantially symmetrical, which makes the touch display device 70 more artistic or appealing in appearance.

In other embodiments, the touch signal line area of the second substrate can be designed according to an actual size of the second substrate, and is not limited to locations described in the above embodiments.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A touch display device, having a first side, a second side, a third side and a fourth side connected end to end, and the touch display device comprising:
    a first substrate;
    a second substrate opposite to the first substrate;
    a display medium layer, sandwiched between the first substrate and the second substrate; and
    a touch-sensitive layer, comprising a plurality of sensitive electrode lines;
    wherein the first substrate comprises a first surface facing the display medium layer and a second surface far away from the display medium layer and opposite to the first surface of the first substrate, the touch-sensitive layer is disposed on the second surface of the first substrate, a plurality of first pins are disposed on a side area of the first substrate corresponding to one of the first side and the second side of the touch display device to connect the sensitive electrode lines, a plurality of second pins are disposed on a side area of the second substrate also corresponding to the same side of the touch display device as the first pins are located in, and connected to the first pins via a first printed circuit board (PCB), and the first PCB is a flexible PCB,
    wherein a touch signal line area and a plurality of third pins are disposed on the second substrate, the third pins comprises a plurality of touch signal pins, and a plurality of touch signal lines are disposed in the touch signal line area to connect the second pins and the corresponding touch signal pins together, wherein the third pins are disposed on a side area of the second substrate corresponding to one of the first side and the second side of the touch display device opposite to where the first pins and the second pins are located in, wherein the third pins are connected to a second PCB, and the second PCB is a flexible PCB, wherein touch signals are sequentially transmitted from the first pins disposed on the first substrate, the first PCB, the second pins disposed on the second substrate, the touch signal line area and the third pins disposed on the second substrate, to reach a fourth pin on the second PCB.

2. The touch display device of claim 1, wherein the second PCB is connected to a third PCB.

3. The touch display device of claim 2, wherein a touch signal processing chip is disposed on the third PCB to receive and process touch signals transferred by the second PCB.

4. The touch display device of claim 3, wherein the third pins further comprises a plurality of display signal pins to transfer display signals between the second substrate and the third PCB.

5. The touch display device of claim 1, wherein lines in the at least one first PCB connected to the first pins are integrated to connect the second pins.

* * * * *